(12) United States Patent
Gibson et al.

(10) Patent No.: US 7,537,244 B2
(45) Date of Patent: May 26, 2009

(54) FLUID FITTING ASSEMBLY

(75) Inventors: James D. Gibson, Huntsville, AL (US); Le Yu, Hilliard, OH (US)

(73) Assignee: Parker Hannifin Corporation, Cleveland, OH (US)

(*) Notice: Subject to any disclaimer, the term of this patent is extended or adjusted under 35 U.S.C. 154(b) by 134 days.

(21) Appl. No.: 11/678,302

(22) Filed: Feb. 23, 2007

(65) Prior Publication Data

US 2007/0194569 A1 Aug. 23, 2007

Related U.S. Application Data

(60) Provisional application No. 60/776,170, filed on Feb. 23, 2006.

(51) Int. Cl.
*F16L 41/00* (2006.01)
(52) U.S. Cl. .................. 285/220; 285/355; 285/212
(58) Field of Classification Search .................. 285/219, 285/221, 355, 353, 357, 212, 347, 220
See application file for complete search history.

(56) References Cited

U.S. PATENT DOCUMENTS

| | | | | |
|---|---|---|---|---|
| 3,003,795 A | * | 10/1961 | Lyon | 285/212 |
| 3,042,248 A | * | 7/1962 | Krueger | 220/240 |
| 3,101,206 A | * | 8/1963 | Franck | 285/220 |
| 3,106,413 A | * | 10/1963 | Hamlin et al. | 285/212 |
| 3,145,035 A | * | 8/1964 | Hanback | 285/110 |
| 3,146,006 A | * | 8/1964 | Schmohl | 285/212 |
| 3,207,524 A | * | 9/1965 | Trbovich | 277/647 |
| 3,262,722 A | * | 7/1966 | Gastineau et al. | 285/212 |
| 3,633,372 A | | 1/1972 | Kimmel et al. | |
| 3,730,563 A | * | 5/1973 | Hanback et al. | 285/114 |
| 3,756,628 A | * | 9/1973 | St. Clair | 285/52 |
| 3,797,263 A | | 3/1974 | Shahir et al. | |
| 3,850,456 A | * | 11/1974 | Hanback et al. | 285/114 |
| 3,971,566 A | * | 7/1976 | Levinsohn et al. | 277/606 |
| 4,011,734 A | | 3/1977 | Jones | |
| 4,150,836 A | * | 4/1979 | Walker | 277/638 |
| 4,877,272 A | * | 10/1989 | Chevallier et al. | 285/111 |
| 5,050,843 A | * | 9/1991 | Brooks | 277/362 |
| 5,052,724 A | * | 10/1991 | Konrad et al. | 285/190 |
| 5,197,769 A | * | 3/1993 | Williamson | 285/212 |
| 5,404,909 A | | 4/1995 | Hanson | |
| 5,533,764 A | * | 7/1996 | Williamson | 285/212 |
| 5,890,719 A | | 4/1999 | Bettencourt | |

(Continued)

FOREIGN PATENT DOCUMENTS

WO 2006004866 1/2006

(Continued)

*Primary Examiner*—David E Bochna
(74) *Attorney, Agent, or Firm*—Renner, Otto, Boisselle & Sklar (57) ABSTRACT

A fluid fitting assembly (100), suitable for use in extreme working temperature conditions, can comprise a receiving member (110) with an inexpensive port design (e.g., SAE J1926 and/or ISO 6149), a standard fitting member (112), and a metal seal member (200). The seal member (200) comprises a ring portion (212) and a shoulder portion (218/220) extending radially from a head-adjacent region of the ring portion (212). The outer radial surface of the ring portion (212) seats against the chamfer section (126) of the receiving member (110) and the head-adjacent axial surface of the shoulder portion (218/220) seats against the undercut section (136) of the fitting member (112).

18 Claims, 9 Drawing Sheets

U.S. PATENT DOCUMENTS

| | | |
|---|---|---|
| 5,944,322 A | 8/1999 | Coff et al. |
| 6,375,232 B1 * | 4/2002 | Robinson .................... 285/220 |
| 6,447,017 B1 | 9/2002 | Gilbreath et al. |
| 6,915,638 B2 | 7/2005 | Runkle et al. |
| 2005/0258647 A1 | 11/2005 | Hagen |

FOREIGN PATENT DOCUMENTS

| | | |
|---|---|---|
| WO | 2006012598 | 2/2006 |

* cited by examiner

FLUID FITTING ASSEMBLY

RELATED APPLICATION

This application claims priority under 35 U.S.C. §119 (e) to U.S. Provisional Patent Application No. 60/776,170, filed on Feb. 23, 2006. The entire disclosure of this provisional application is hereby incorporated by reference.

GENERAL FIELD

This disclosure relates generally to a fluid fitting assembly and, more particularly, to a fluid fitting assembly comprising a fitting member, a receiving member, and a seal member.

BACKGROUND

A fluid fitting assembly can comprise a receiving member, a fitting member, and a seal member. The receiving member has a body (e.g., a block or tubular structure) and a port formed therein which communicates with a volume of pressurized fluid. In an inexpensive port design (e.g., SAE J1926 and/or ISO 6149), the port includes an internal thread section and a chamfer section between a port-surrounding surface of the body and the thread section. A standard (and low cost) fitting member comprises a head and a shank having an external thread section and an undercut section between the head and the thread section. When the fitting member is coupled to the receiving member (i.e., the respective thread sections are screwed together), the chamfer section of the receiving member and the undercut section of the fitting member form a chamber within the port. The seal member (i.e., an elastomeric O-ring) is squeezed into this chamber to seal the interface between the receiving member and the fitting member.

SUMMARY

A seal member is provided which is compatible with inexpensive and readily available (e.g., off-the-shelf) parts and which is also able to accommodate extreme working temperature conditions without any compromise in sealability. Specifically, for example, the seal member can be used in a fluid fitting assembly comprising a receiving member with an inexpensive port design (e.g., SAE J1926 and ISO 6149) and a standard fitting member. The seal member allows a fluid fitting assembly to be used, for example, in cryogenic settings (i.e., temperatures less than 0° F., less than −50° F. and/or less than −100° F.) or combustion settings (i.e., temperatures greater than 500° F., greater than 750° F., and/or greater than 1000° F.). In contrast, an elastomeric O-ring has a very narrow working temperature range and, if the temperature is too high or too low, performance is degraded and sealability is compromised. While an extreme temperature fluid fitting assembly can be made with special port designs, non-standard fittings, and the fabrication of unique parts, such costly and time-consuming parts/steps are not necessary with the seal member.

DRAWINGS

FIGS. 2A-8A are cross sectional views of a seal member 200, a seal member 300, a seal member 400, a seal member 500, a seal member 600, a seal member 700, and a seal member 800, respectively.

FIGS. 2B-8B are close-up cross-sectional views of the seal member 200/300/400/500/600/700/800 installed in the fluid fitting assembly, these figures schematically showing (by dashed lines) the seal's interference fit with the receiving member and the fitting member.

FIGS. 2C-8C are close-up cross-sectional views of the seal member 200, the seal member 300, the seal member 400, the seal member 500, the seal member 600, the seal member 700, and the seal member 800, respectively.

DETAILED DESCRIPTION

Figure 1A:
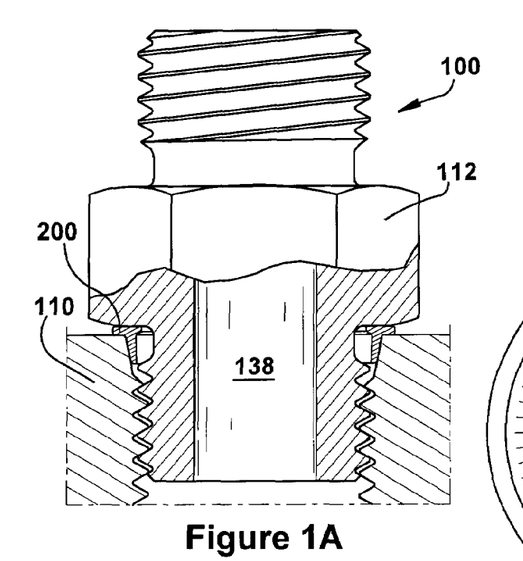
FIGS. 1A-1C are cross-sectional views of a fluid fitting assembly comprising a receiving member, a fitting member, and a seal member, wherein the fitting member is a conduit connection, an instrumentation receptacle, and a plug, respectively.
Figure 1B:
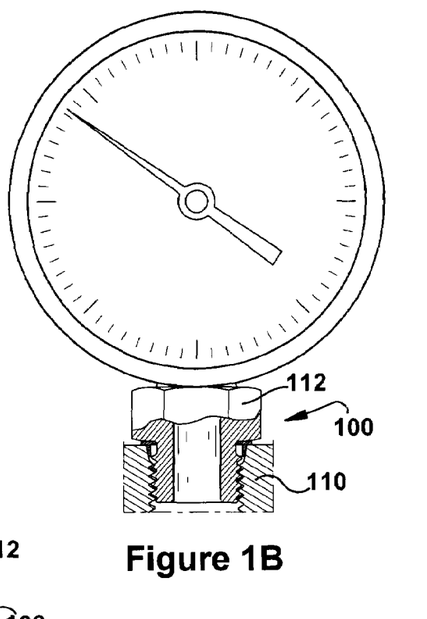
Figure 1C:
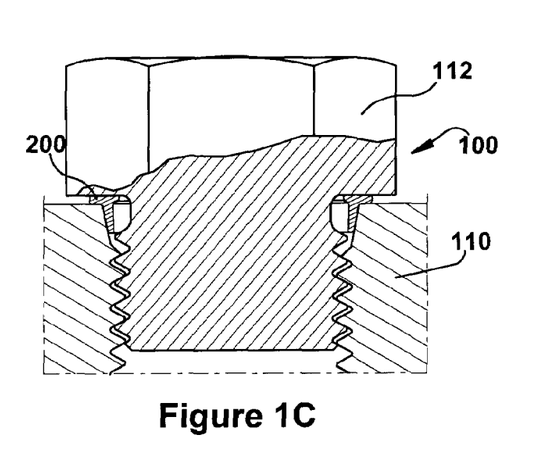

Referring now to the drawings, and initially to FIGS. 1A-1C, a fluid fitting assembly 100 is shown which can be used in extreme working temperature conditions. The assembly 100 can be used, for example, in cryogenic settings (i.e., temperatures less than 0° F., less than −50° F. and/or less than −100° F.) or combustion settings (i.e., temperatures greater than 500° F. greater than 750° F., and/or greater than 1000° F.).

The fluid fitting assembly 100 comprises a receiving member 110 and a fitting member 112. The receiving member 110 can have an inexpensive port design (e.g., SAE J1926 and ISO 6149). The fitting member 112 can be a standard fitting and can comprise, for example, a conduit connector (FIG. 1A), a plug (FIG. 1B), or an instrumental receptacle (FIG. 1C). The receiving member 110 and/or the fitting member 112 can be made of any material that can withstand the extreme working temperature conditions, including a metal, such as, for example, aluminum, steel, stainless steel, copper, brass, titanium, nickel, and/or alloys thereof.

Figure 1D:
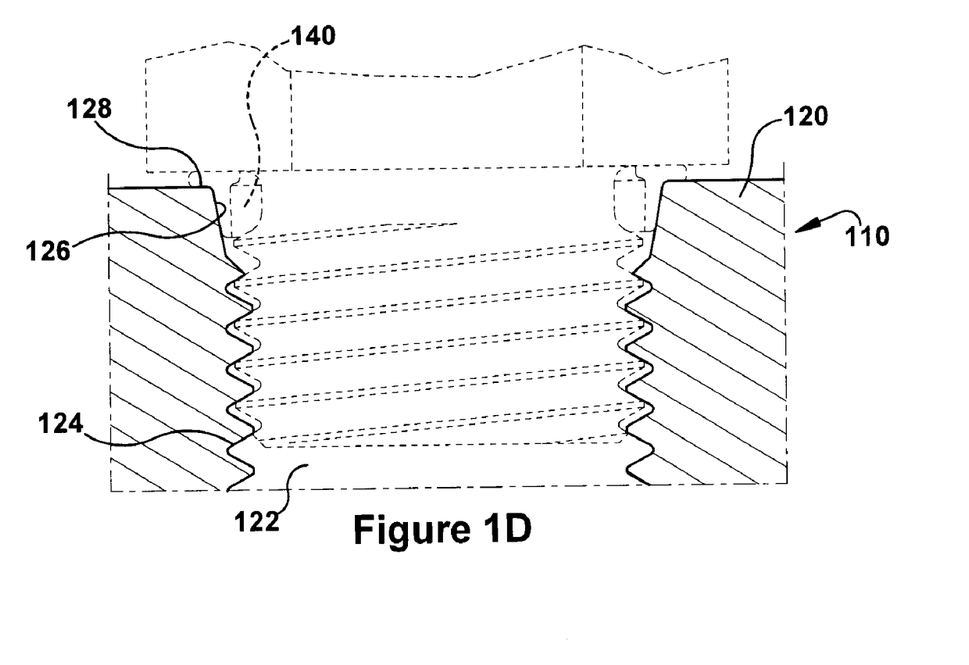
FIG. 1D is a cross-sectional view of the receiving member, with the fitting member and the seal member being shown in phantom.
Figure 1E:
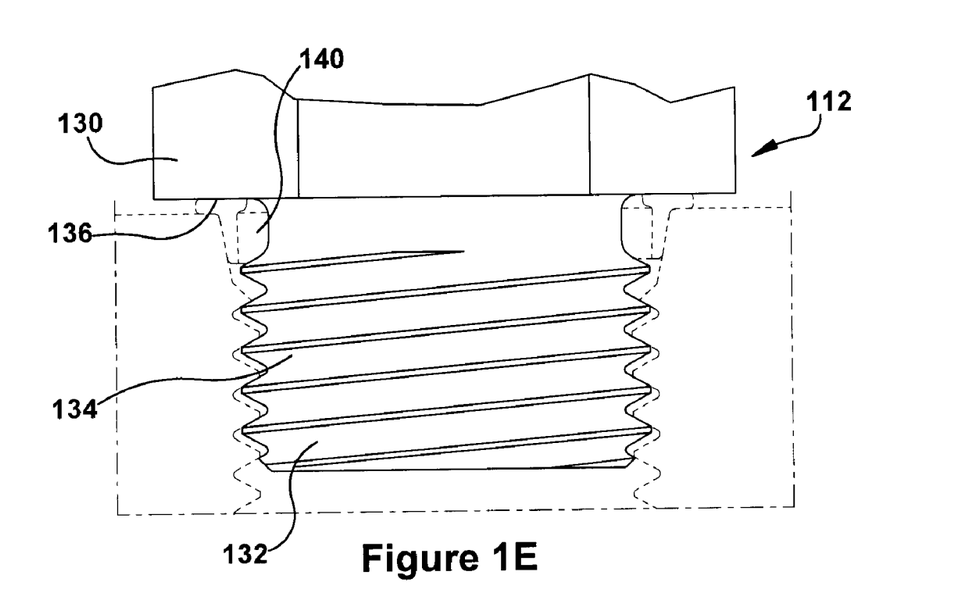
FIG. 1E is a cross-sectional view of the fitting member, with the receiving member and the seal member being shown in phantom.

As is best seen by referring additionally to FIG. 1D, the receiving member 110 comprises a body 120 and a port 122 in the body 120. The port 122 includes an internal thread section 124 and a chamfer section 126 between a port-surrounding surface 128 of the body 120 and the internal thread section 124. In most cases, the port 122 will communicate with a pressurized volume of fluid. As is best seen by referring additionally to FIG. 1E, the fitting member 112 can be a standard fitting and comprises a head 130 and a shank 132. The shank 132 includes an external thread section 134 and a undercut section 136 between the head 130 and the external thread section 134. If the fitting member 112 is a connector or a receptacle, a fluid passage 138 (see FIG. 1A) will usually pass through the head 130 and the shank 132.

The fitting member 112 is coupled to the receiving member 110 (e.g., the thread sections 124 and 134 may be screwed together). The chamfer section 126 of the receiving member 110 and the undercut section 136 of the fitting member 112 form a chamber 140 within the port 122.

Figure 2A:
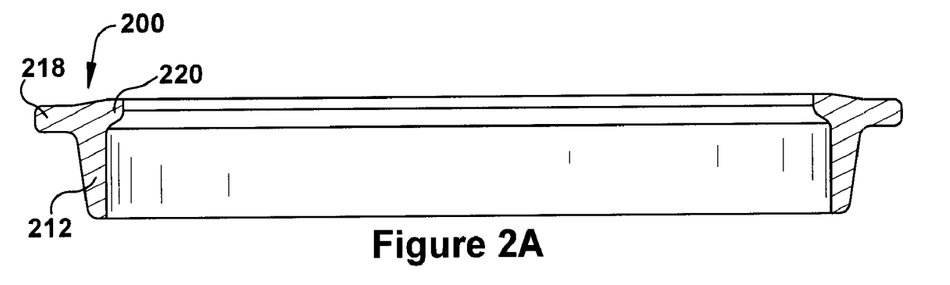
Figure 3A:
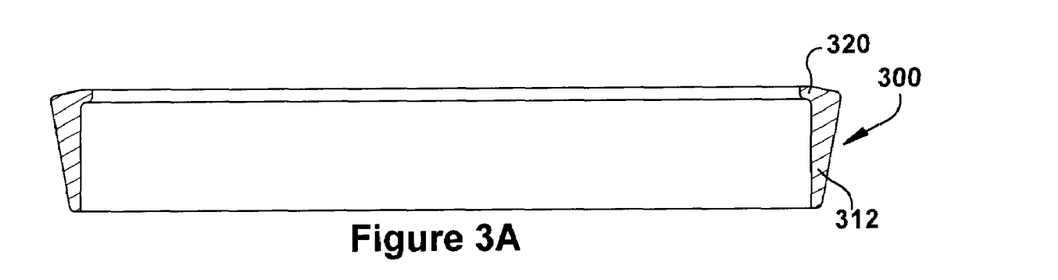
Figure 3B:
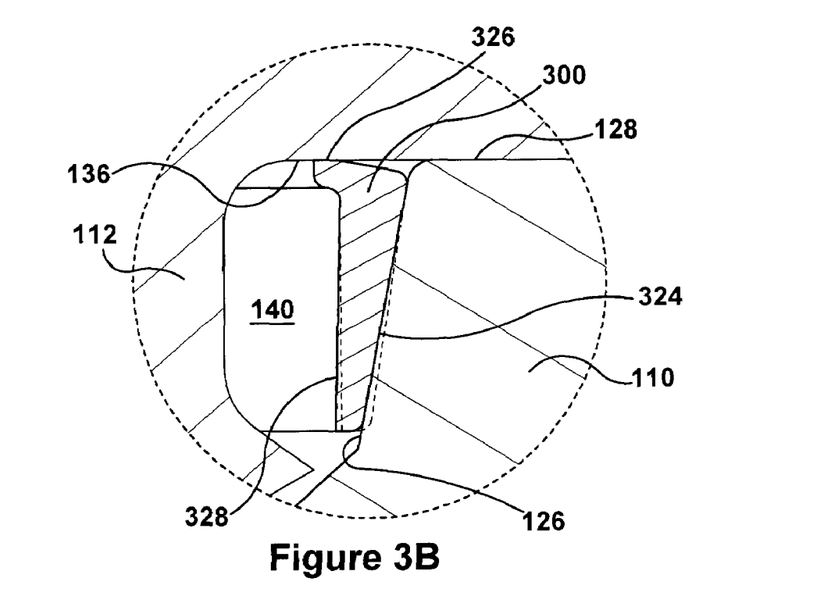
Figure 3C:
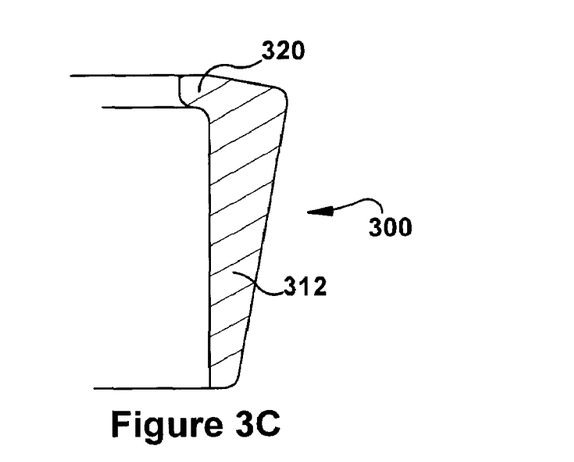
Figure 4A:
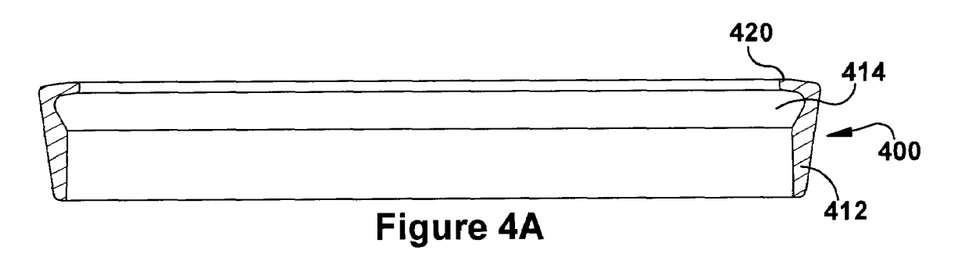
Figure 4B:
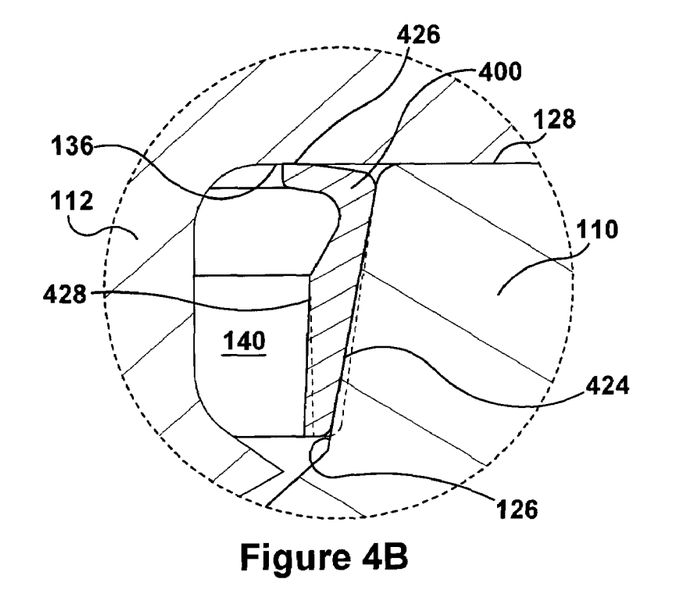
Figure 4C:
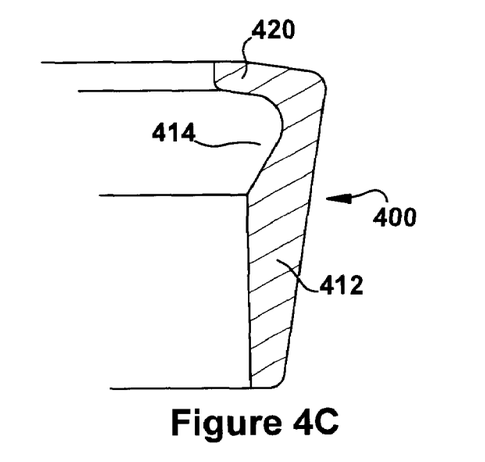
Figure 5A:
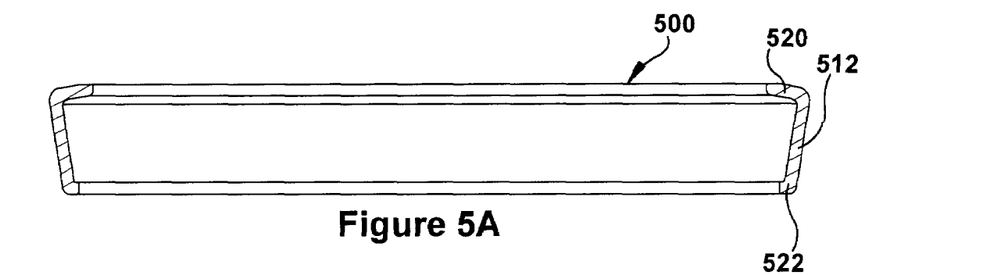
Figure 5B:
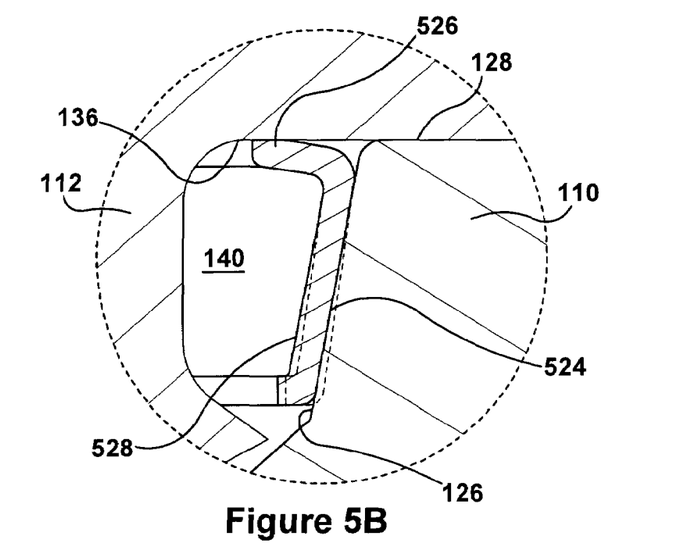
Figure 5C:
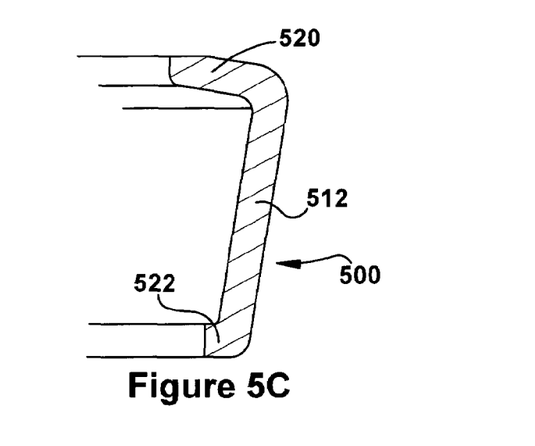
Figure 6A:
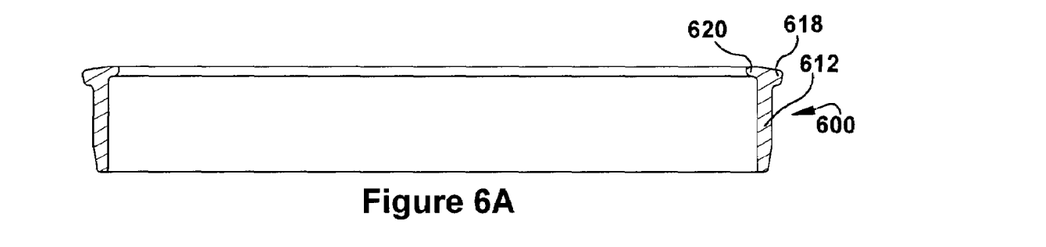
Figure 6B:
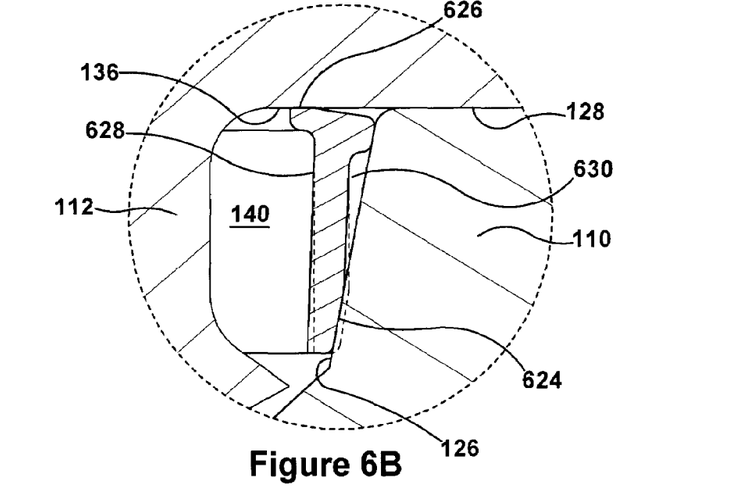
Figure 6C:
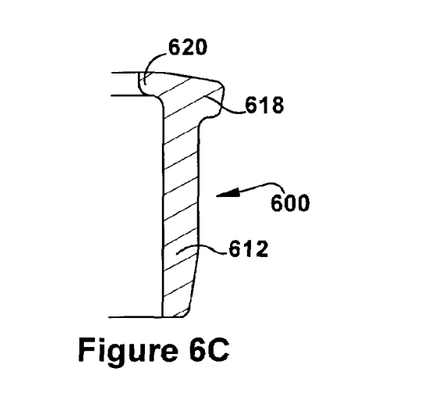
Figure 7A:
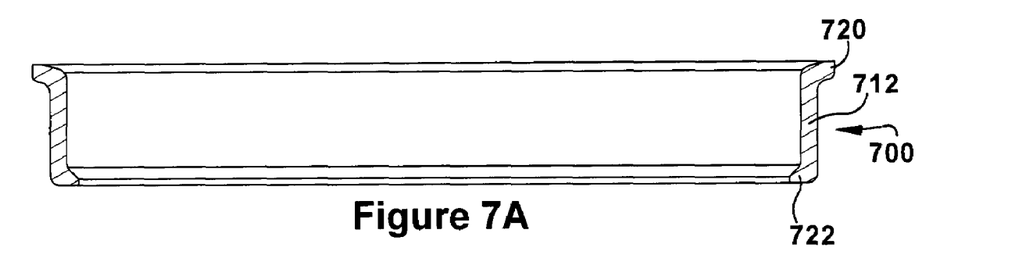
Figure 7B:
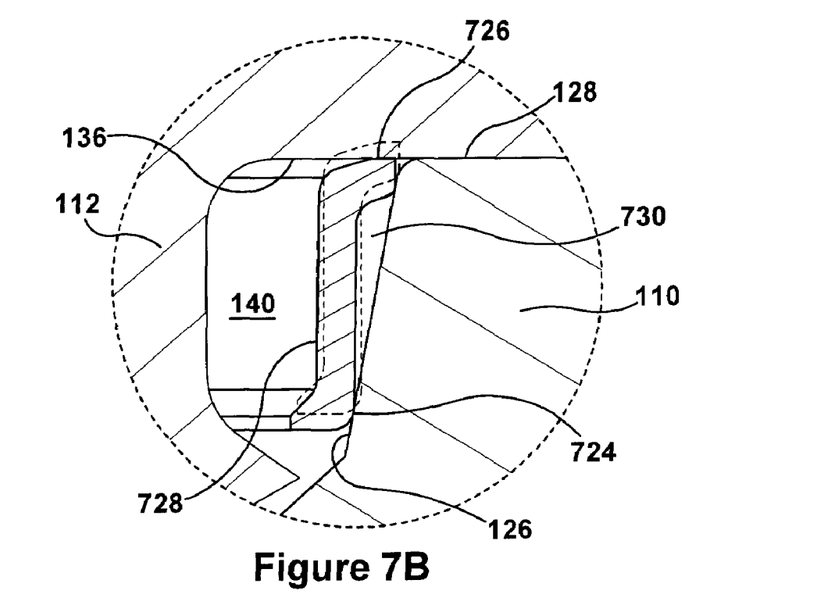
Figure 7C:
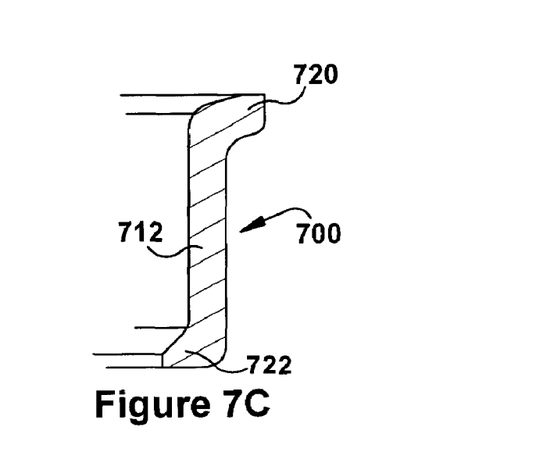
Figure 8A:
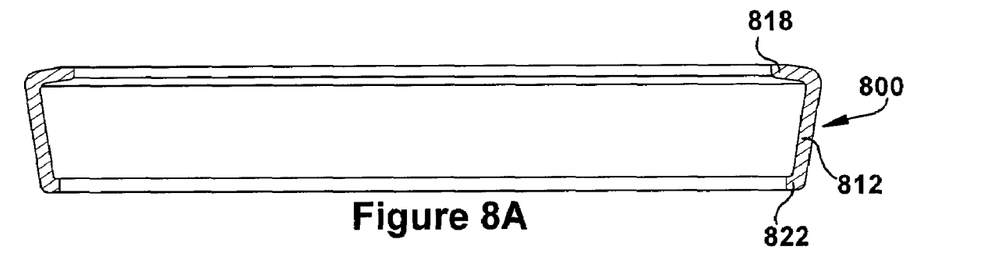
Figure 8B:
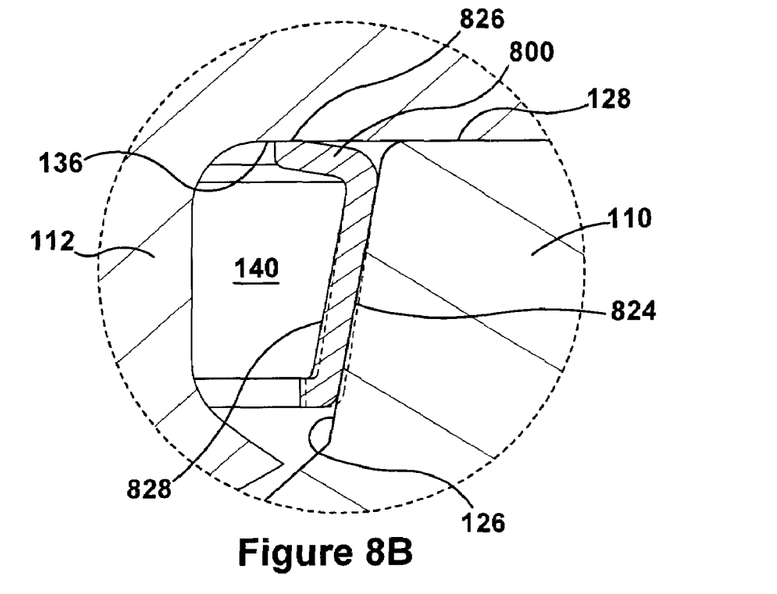
Figure 8C:
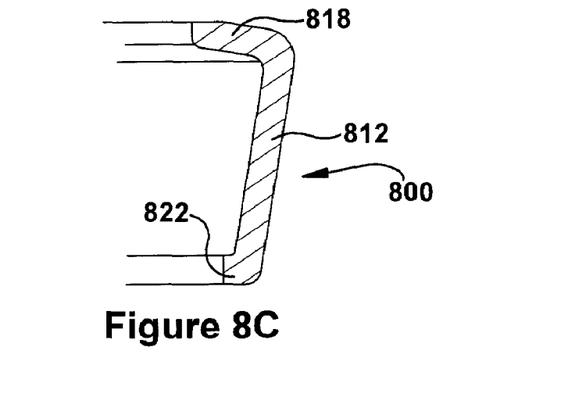

The fluid fitting assembly 100 further comprises a seal member for sealing the interface between the receiving member 110 and the fitting member 112. The seal member can be the seal member 200 shown in FIGS. 1A-1D and shown in more detail in FIGS. 2A-2C. The seal member can instead comprise, for example, the seal member 300 shown in FIGS. 3A-3C, the seal member 400 shown in FIGS. 4A-4C, the seal member 500 shown in FIGS. 5A-5C, the seal member 600 shown in FIGS. 6A-6C, the seal member 700 shown in FIGS. 7A-7C, or the seal member 800 shown in FIGS. 8A-8C.

The seal member 200 (FIGS. 2A-2C) has a cross-sectional geometry roughly resembling a small case letter "r." The member 200 comprises a ring portion 212 and shoulder portions 218 and 220 extending radially from a head-adjacent region of the ring portion 212. Specifically, the shoulder portion 218 extends radially outward from the ring portion 212 and sits on the port-surrounding surface 128 of the receiving member 110. (See FIG. 2B.) The shoulder portion 220 extends radially inward from the ring portion 212. The outer radial surface of the ring portion 212 forms a chamfer-seating surface 224 which seats against the chamfer section 126 of the receiving member 110. The head-adjacent axial surfaces of the shoulder portions 218 and 220 form an undercut-seating surface 226 that seats against the undercut section 136 of the fitting member 112.

The ring portion 212 has an interference geometry relative to the chamfer section 126 and the shoulder portion 218 has an interference geometry relative to the undercut section 136. (See FIG. 2B.) The geometry of the seal member 200, and its positioning within the chamber 140, result in the seal acting in a spring-like manner, pressing the seating surface 224 and the seating surface 226 against the chamber section 126 and the undercut section 136, respectively. An interference overlap in the range of 0.001 to 0.010 inch will usually be sufficient to provide the desired spring action and/or sealability.

Figure 2B:
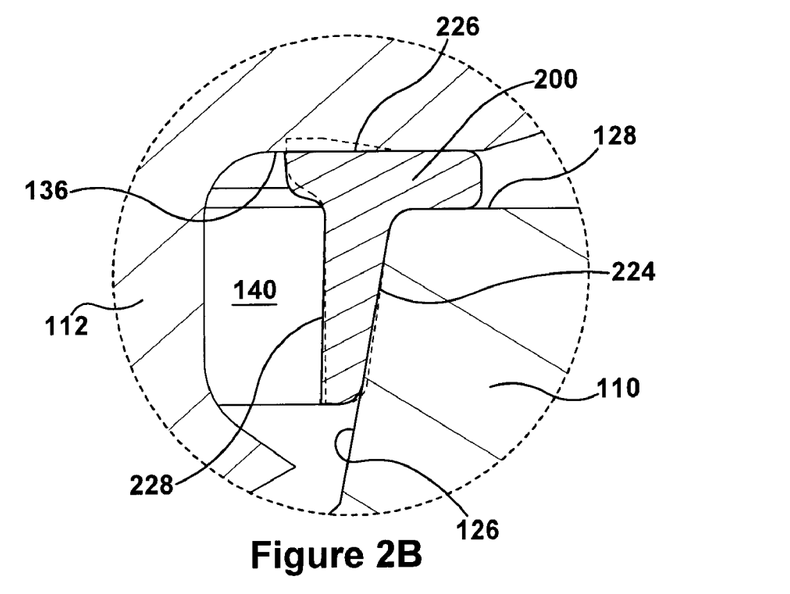
Figure 2C:
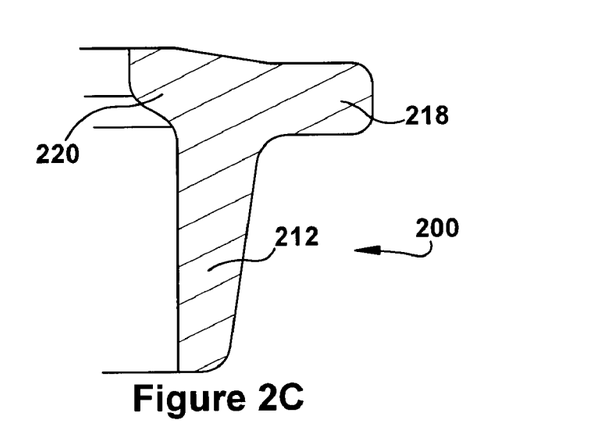

If the port 122 in the receiving member 110 communicates with a volume of pressurized fluid, this fluid will occupy the chamber 140. The inner radial surface of the ring portion 212 and the thread-adjacent axial surface of the shoulder portion 220 form a fluid-contacting surface 228. When the pressurized fluid contacts the surface 228, this further urges the seating surfaces 224/226 toward the sections 126/136.

The seal member 300 (FIGS. 3A-3C) has a sectional geometry similar to the outline of a traditional handsaw. The member 300 comprises a ring portion 312 and a shoulder portion 320 extending radially inward from a head-adjacent region of the ring portion 312. The outer radial surface of the ring portion 312 forms the chamfer-seating surface 324 and the head-adjacent axial surface of the shoulder portion 320 forms the undercut-seating surface 326. The ring portion 312 has an interference geometry relative to the chamfer section 126. (See FIG. 3B.) The inner radial surface of the ring portion 312 and the thread-adjacent axial surface of the shoulder portion 320 form the fluid-contacting surface 328. The seal member 300 is positioned completely within the port 122 and does not include a shoulder portion contacting the port-surrounding surface 128.

The seal member 400 (FIGS. 4A-4C) is similar to the seal member 300, except that the ring portion 412 includes a notch 414 in its radially inner surface, whereby the seal's cross-sectional geometry somewhat resembles a compass saw. The ring portion 412 has an interference geometry relative to the chamfer section 126. (See FIG. 4B.) The notch 414 functions in a hinge-like manner, biasing the seating surface 424 against the chamfer section 126 and the seating surface 426 against the undercut section 136. The inner radial surface of the ring portion 412 (including the notch 414) and the thread-adjacent axial surface of the shoulder portion 420 form the fluid-contacting surface 428.

The seal member 500 (FIGS. 5A-5C) has a ring portion 512 and a shoulder portion 520 having substantially the same (and uniform) thickness whereby the seal has a generally "L" cross-sectional shape. A slight shoulder portion 522 (or protrusion) extends radially inward from an thread-adjacent region of the ring portion 512. The outer radial surface of the ring portion 512 forms the chamfer-seating surface 524 and the head-adjacent axial surface of the shoulder portion 520 forms the undercut-seating surface 526. The ring portion 512 has an interference geometry relative to the chamfer section 126 that presses the seating surfaces 524/526 against the sections 126/136. (See FIG. 5B.) The inner radial surface of the ring portion 512 and the thread-adjacent axial surface of the shoulder portion 520 form the fluid-contacting surface 528.

The seal member 600 (FIGS. 6A-6C) has a capital "T" shape (in cross-section). The member 600 comprises a ring portion 612, a shoulder portion 618 extending radially outward from the ring portion 612, and a shoulder portion 620 extending radially inward from the ring portion 612. The chamfer-seating surface 624 is formed by the radially inward surface of the ring portion 612 and the radially inward surface of the shoulder 620, with a pocket 630 being positioned therebetween. The undercut-seating surface 626 is formed by the head-adjacent axial surfaces of the shoulder portions 618 and 620. The region of the ring portion 612 positioned beyond the pocket 630 has an interference geometry relative to the chamfer section 126. (See FIG. 6B.)

The seal member 700 (FIGS. 7A-7C) comprises a ring portion 712, a shoulder portion 720 extending radially outward from a head-adjacent region of the ring portion 712, and a shoulder portion 722 extending radially inward from a thread-adjacent region of the ring portion 712. The seal's cross-sectional shape mimicks an elongated letter "S." The outer radial surfaces of the ring portion 712 and the shoulder portion 718 form the chamfer-seating surface 724, with a pocket 730 therebetween. The head-adjacent axial surface of the shoulder portion 718 forms the undercut-seating surface 726. The radially inner surface of the ring portion 712 and the thread-adjacent axial surface of the shoulder 722 form the fluid-contacting surface 728. The region of the ring portion 712 positioned beyond the pocket 730, and the adjoining region of the shoulder 722, have an interference geometry relative to the chamfer section 126. The shoulder portion 718 has an interference fit relative to the undercut section 136. (See FIG. 7B.)

The seal member 800 (FIGS. 8A-8C) resembles (in cross-sectional) a capital letter "L" with a slight protrusion on the end of its longer leg. The member 800 comprises a ring portion 812, a shoulder portion 818 extending radially inward from a head-adjacent region of the ring portion 812, and a shoulder portion 822 extending radially inward from a thread-adjacent region of the ring portion 812. The outer radial surface of the ring portion 812 forms the chamfer-seating surface 824 and the head-adjacent axial surface of the shoulder portion 818 forms the undercut-seating surface 826. The radially inner surface of the ring portion 812, the thread-adjacent axial surface of the shoulder 818, and the thread-adjacent axial surface of the shoulder 822 form the fluid-contacting surface 828. The ring portion 812 has an interference geometry relative to the chamfer section 126.

The seal member 200/300/400/500/600/700/800 can be made of metal such as, for example, aluminum, steel, stainless steel, copper, brass, titanium, nickel, and/or alloys thereof. For example, the seal member can be made from stainless steel (e.g., 302SS or 316SS) and/or can be provided with a silver plating or other soft sealing metal. The seal member can be made in one-piece and/or made by machining, stamping, or any other suitable technique. If the receiving member 110 and/or the fitting member 112 are also made of metal, there will be metal-to-metal contact at the seating surfaces and/or sections 126/136. The receiving member 110, the fitting member 112, and the seating member can be made of the same metal (e.g., stainless steel) or of different metals and/or materials.

To assemble the receiving member 110, the fitting member 112, and the seal member 200/300/400/500/600/700/800, the shank 132 of the fitting member 112 is inserted through the seal member and the seal member is located within the undercut section 136. The fitting member 112 is then coupled with (e.g., screwed to) the receiving member 110, thereby trapping the seal member in the chamber 140 and positioning it relative to the chamfer section 126 and the undercut section 136. To disassemble, the fitting member 112 is uncoupled (e.g., unscrewed) from the receiving member 110 and seal member will usually remain with fitting member 112 when it is withdrawn from the port 122. The seal member can then be removed from the shank 132 and replaced with a new seal member.

One may now appreciate that the fluid fitting assembly 100 can comprise a receiving member 110 with an inexpensive port design (e.g., SAE J1926 and/or ISO 6149) and a standard fitting member 112, and thanks to the seal member, still be suitable for use in extreme working temperature conditions. Although the fluid fitting assembly 100, the receiving member 110, the fitting member 112, and/or the seal members have been shown and described with respect to certain embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such feature may be combined with one or more other features of the other embodiments, as may be desired and advantageous for any given or particular application.

The invention claimed is:

1. A fluid fitting assembly comprising a receiving member, a fitting member, and a seal member; wherein:
   the receiving member comprises a body and a port in the body, the port including an internal thread section and a chamfer section between a port-surrounding surface of the body and the internal thread section;
   the fitting member comprises a head and a shank, the shank including an external thread section and an undercut section between the head and the external thread section;
   the fitting member is coupled to the receiving member and the respective thread sections are screwed together whereby the chamfer section of the receiving member and the undercut section of the fitting member form a chamber in the port within which the seal member is positioned;
   the seal member comprises a ring portion and a shoulder portion extending radially from a head-adjacent region of the ring portion;
   the outer radial surface of the ring portion forms a chamfer-seating surface which seats against the chamfer section of the receiving member;
   the head-adjacent axial surface of the shoulder portion forms an undercut-seating surface which seats against the undercut section of the fitting member;
   the ring portion has an interference geometry relative to the chamfer section of the receiving member and/or the shoulder portion has an interference geometry relative to the undercut section of the fitting member, whereby the seal member acts in a spring-like manner, pressing the seating surface against the chamber section and the undercut section, respectively; and
   wherein, when the port in the receiving member communicates with a volume of pressurized fluid, the inner radial surface of the ring portion and the thread-adjacent axial surface of the shoulder portion form a fluid-contacting surface against which fluid will push to further urge the seating surfaces towards the chamfer section and the undercut section;
   wherein the ring portion has an interference geometry relative to the chamfer section of the receiving member having an interference overlap in the range of 0.001 to 0.010 inch.

2. A fluid fitting assembly as set forth in claim 1, wherein the volume of pressurized fluid is at a temperature less than 0°F or greater than 500° F.

3. A fluid fitting assembly as set forth in claim 1, wherein the fitting member is a conduit connector, a plug, or an instrumental receptacle.

4. A fluid fitting assembly as set forth in claim 1, wherein the seal member is made of metal.

5. A fluid fitting assembly as set forth in claim 4, wherein the metal comprises stainless steel.

6. A fluid fitting assembly as set forth in claim 5, wherein the seal member is coated with silver or another soft sealing metal.

7. A fluid fitting assembly as set forth in claim 4, wherein seal member is made in one-piece.

8. A fluid fitting assembly as set forth in claim 4, wherein the fitting member and the receiving member are made of metal, whereby there is metal-to-metal contact at the seating surfaces.

9. A fluid fitting assembly as set forth in claim 1, wherein seal member is made in one-piece.

10. A fluid fitting assembly as set forth in claim 1, wherein the fitting member, the receiving member, and the seal member are made of metal, whereby there is metal-to-metal contact at the seating surfaces.

11. A fluid fitting assembly as set forth in claim 1, wherein the shoulder portion extends radially outward from the head-adjacent region of the ring portion.

12. A fluid fitting assembly as set forth in claim 11, wherein the shoulder portion contacts the port-surrounding surface of the receiving member.

13. A fluid fitting assembly as set forth in claim 1, wherein the shoulder portion extends radially inward from the head-adjacent region of the ring portion.

14. A fluid fitting assembly as set forth in claim 1, wherein the seal member comprises a second shoulder portion extending radially inward from a thread-adjacent region of the ring portion.

15. A fluid fitting assembly as set forth in claim 1, wherein the ring portion of the seal member has a notch in its axially inner surface adjacent the shoulder portion.

16. A fluid fitting assembly as set forth in claim 1, wherein a non-seating pocket region is positioned between the radially outward surface of the ring portion and a radially outward surface of the shoulder portion.

17. A fluid fitting assembly as set forth in claim 1, wherein the shoulder portion has an interference geometry relative to the undercut section of the fitting member.

18. A fluid fitting assembly comprising a receiving member, a fitting member, and a seal member: wherein:
   the receiving member comprises a body and a port in the body, the port including an internal thread section and a chamfer section between a port-surrounding surface of the body and the internal thread section;

the fitting member comprises a head and a shank, the shank including an external thread section and an undercut section between the head and the external thread section;

the fitting member is coupled to the receiving member and the respective thread sections are screwed together whereby the chamfer section of the receiving member and the undercut section of the fitting member form a chamber in the port within which the seal member is positioned;

the seal member comprises a ring portion and a shoulder portion extending radially from a head-adjacent region of the ring portion;

the outer radial surface of the ring portion forms a chamfer-seating surface which seats against the chamfer section of the receiving member;

the head-adjacent axial surface of the shoulder portion forms an undercut-seating surface which seats against the undercut section of the fitting member;

the ring portion has an interference geometry relative to the chamfer section of the receiving member and/or the shoulder portion has an interference geometry relative to the undercut section of the fitting member, whereby the seal member acts in a spring-like manner, pressing the seating surface against the chamber section and the undercut section, respectively; and wherein, when the port in the receiving member communicates with a volume of pressurized fluid, the inner radial surface of the ring portion and the thread-adjacent axial surface of the shoulder portion form a fluid-contacting surface against which fluid will push to further urge the seating surfaces towards the chamfer section and the undercut section;

wherein the shoulder portion has a radially outward surface which forms part of the chamfer-seating surface which seats against the chamfer section of the receiving member.

* * * * *